United States Patent [19]

Lemons

[11] Patent Number: 5,131,692
[45] Date of Patent: Jul. 21, 1992

[54] PIPE CONNECTOR WITH THREADED SEAL IN NONTHREADED CAVITY

[75] Inventor: George D. Lemons, Stephenville, Tex.

[73] Assignee: FMC Corporation, Chicago, Ill.

[21] Appl. No.: 474,864

[22] Filed: Feb. 5, 1990

Related U.S. Application Data

[63] Continuation-in-part of Ser. No. 373,541, Jun. 30, 1989, abandoned.

[51] Int. Cl.$^5$ ............................................. F16L 25/00
[52] U.S. Cl. ............................. 285/334.2; 285/353; 285/379; 285/924; 285/388
[58] Field of Search ............. 285/334.1, 334.3, 397, 285/909, 379, 334.2, 911, 382, 239, 23, 353, 924, 388

[56] References Cited

U.S. PATENT DOCUMENTS

| | | | |
|---|---|---|---|
| 216,736 | 6/1879 | Hall | 285/239 |
| 1,996,855 | 4/1935 | Cheswright | 285/239 |
| 3,767,233 | 10/1973 | Hodge | 285/239 |
| 4,114,930 | 9/1978 | Perkins et al. | 285/382 X |
| 4,563,025 | 1/1986 | Poe | 285/334.2 |
| 4,597,594 | 7/1986 | Kacalieff et al. | 285/239 |
| 4,927,192 | 5/1990 | Ungchusri et al. | 285/334.2 X |
| 4,997,214 | 3/1991 | Reese | 285/382 X |

FOREIGN PATENT DOCUMENTS

| | | | |
|---|---|---|---|
| 0684896 | 4/1964 | Canada | 285/239 |
| 0013006 | 6/1898 | United Kingdom | 285/239 |
| 0571066 | 8/1945 | United Kingdom | 285/155 |

*Primary Examiner*—Dave W. Arola
*Attorney, Agent, or Firm*—Michael Lee; R. C. Kamp; R. B. Megley

[57] ABSTRACT

A pipe connector device for selectively interconnecting a pair of pipe elements in an end-to-end relationship and for sealing a junction between the elements to prevent leaks. A first and a second pipe element each includes a cavity adjacent to a center bore in the pipe element. The first pipe element has a substantially smooth inner surface which defines an outer boundary of a first cavity. An annular seal mounted in the cavities seal the junction between the pipe elements. A threaded outer portion of the seal has a plurality of radially outer points which press against the inner surface of the first cavity to retain the annular seal in the first cavity when the pipe elements are separated.

6 Claims, 3 Drawing Sheets

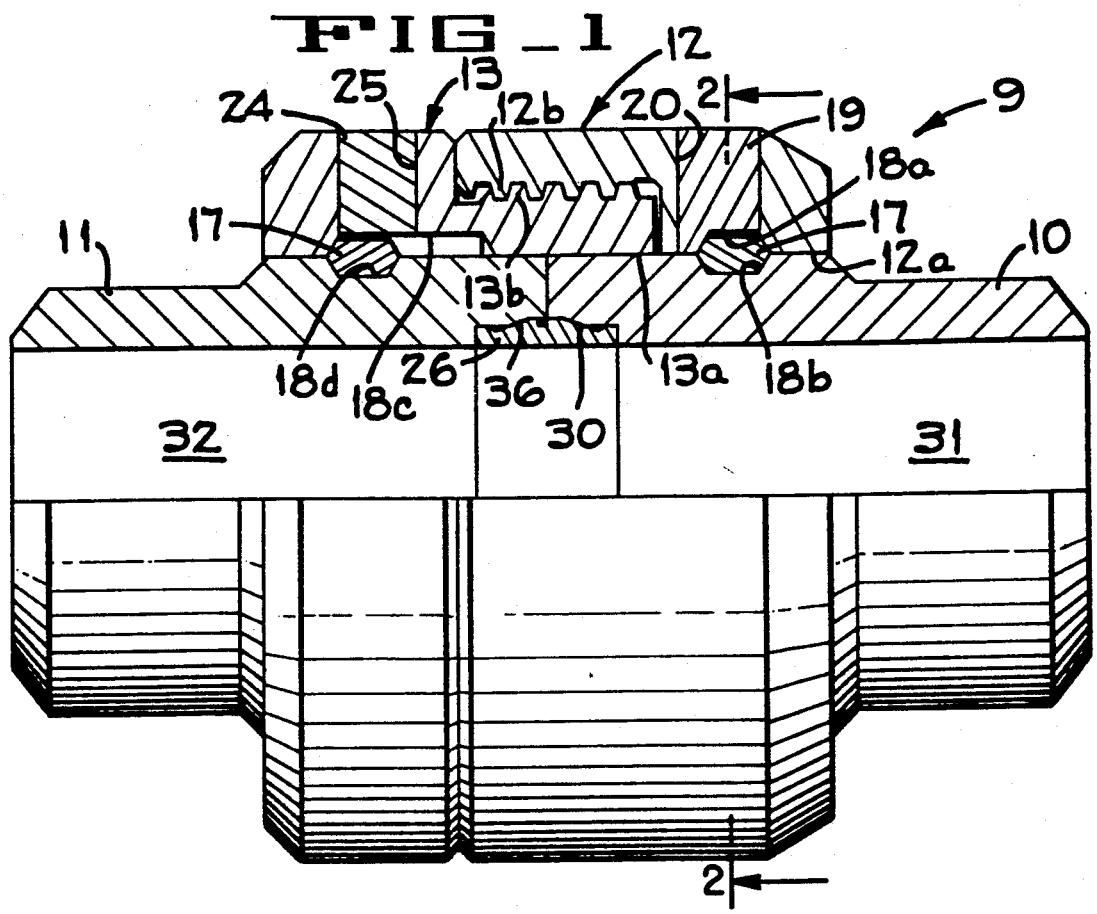
FIG_1
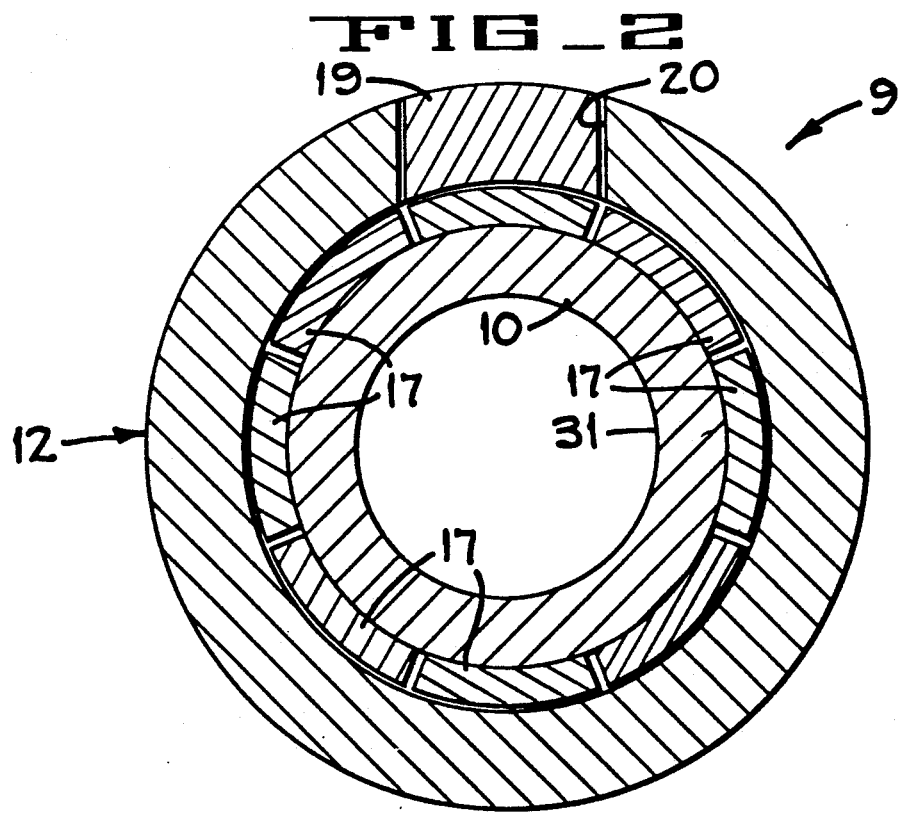
FIG_2

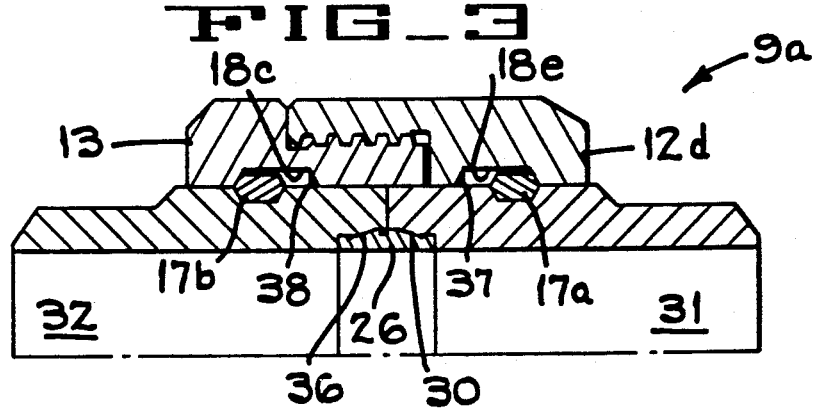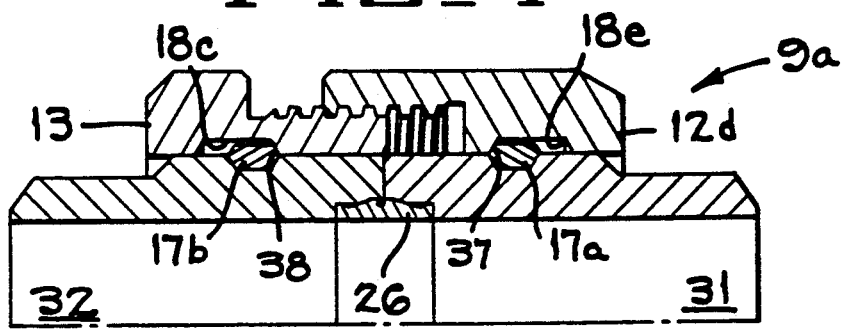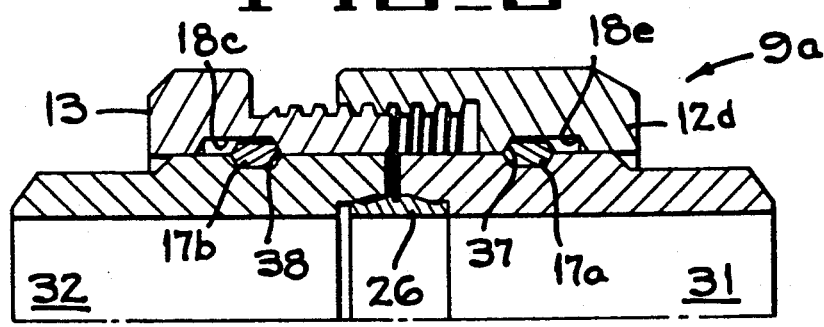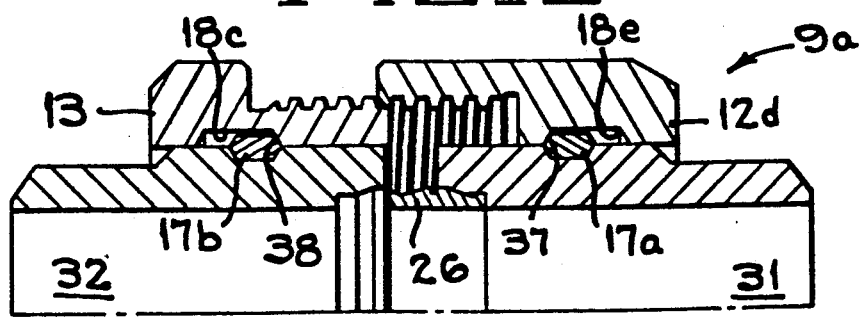

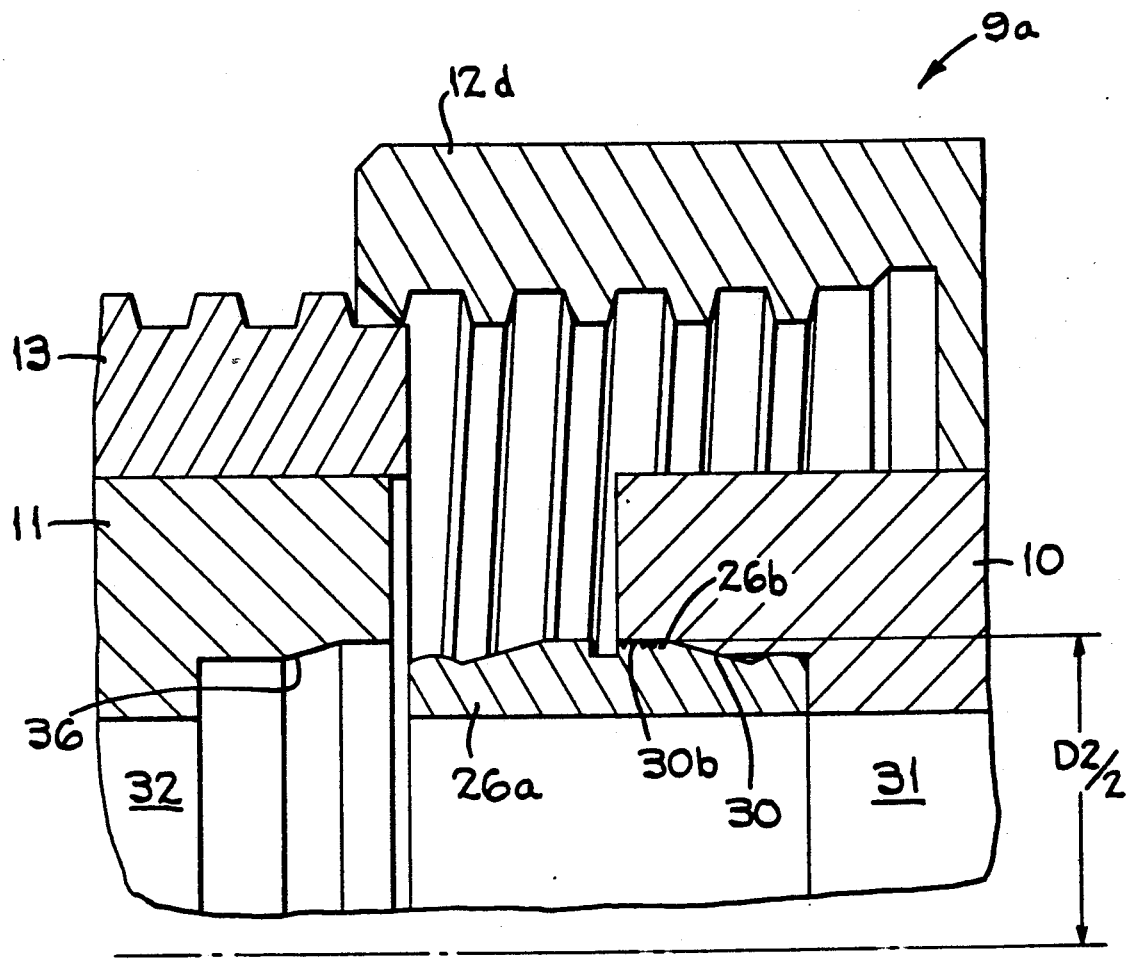
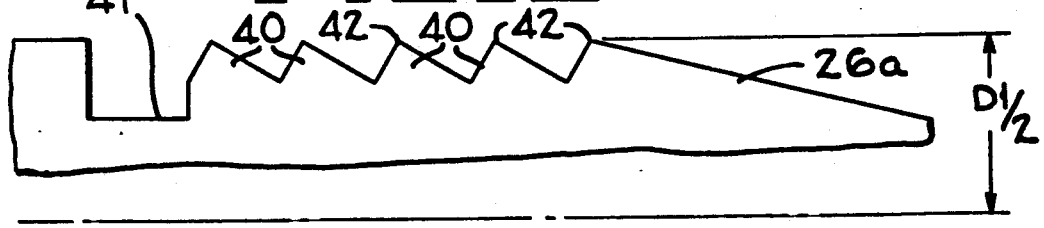
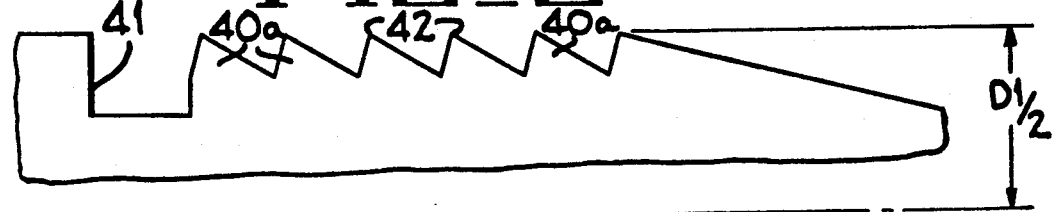

PIPE CONNECTOR WITH THREADED SEAL IN NONTHREADED CAVITY

CROSS REFERENCE TO RELATED APPLICATION

The present application is a continuation-in-part of my prior application Ser. No. 07/373,541 filed Jun. 30, 1989.

BACKGROUND OF THE INVENTION

This invention relates to pipe connector devices, and more particularly, to such connector devices for use in temporary and quasi-permanent pipe flowlines.

Temporary and permanent flowlines are commonly used in production, drilling, cementing, stimulation, injection and testing of oil and gas wells. Flexible devices with quick connections at the ends provide a quick and convenient layout of the piping system and provide fluid tight seals between the mating pipe element members. Some of the flexible devices used are swivel joints, hoses, composite structure pipe, and ball joints. Seals and separate connections are required at each end of the device. Connections include hammer type unions, flanges, clamps, specialty couplings, and pipe threads.

SUMMARY OF THE INVENTION

The present invention discloses a pipe connector device that can selectively serve as a swivel joint and as a pipe connector. This reduces the number of seal leak paths in the total piping system; reduces the number of variations in pipe elements required; enhances the utility of individual pipe elements; and reduces the cost of pipe elements required. A pair of pipe retention members each have an internal bore for receiving one of a pair of pipe elements. Each of the retention members is secured to a corresponding one of the pipe elements by a load element, such as a load ring. The retention members are interconnected by pipe threads or other means to secure the pipe elements in a fixed end-to-end relationship. The retention members can be interconnected with the pipe elements positioned a distance apart and the retention members rotated relative to each other to pull the pipe elements into tight alignment. The retention members can be readily disconnected from the pipe elements by merely removing the load elements and the retention members removed from the pipe elements.

The pipe elements each have a central bore extending lengthwise through the pipe element and each element has a cavity adjacent to the central bore. A first one of the pipe elements includes a substantially smooth inner surface defining an outer boundary of its cavity. An annular seal is mounted in the two cavities when the pipe elements are connected, with the seal extending along a portion of the lengths of the two pipe elements adjacent to an end portion of each of the pipe elements. Thus, the seal extends across a junction of the pipe elements to prevent leakage at a joint between the pipe elements. The annular seal includes an outer portion having a plurality of threads which press against the smooth inner surface of the cavity in the first pipe element. The seal can be pressed into the smooth cavity causing the threads of the seal to press against the surface of the cavity of the first pipe so the seal remains in the cavity when the two pipe elements are separated thereby preventing dropping and losing the seal. The annular seal and its threads have an outer diameter slightly larger than the diameter of the smooth cavity so an outer portion of the threads press tightly against the inner surface which defines the outer boundary of the cavity. When a pair of threaded nuts are used as the retention members the joined pipe elements can be identical thereby reducing the number of different elements to be manufactured. The profile of the pipe elements of the present invention is small compared to unions and similar devices in prior art connectors.

BRIEF DESCRIPTION OF THE DRAWINGS

FIG. 1 is a side elevation, partly in section, of one embodiment of a pipe connector of the present invention.

FIG. 2 is an end section of the pipe connector of FIG. 1 taken along line 2 — 2 of FIG. 1.

FIGS. 3 - 6 are partial sections of another embodiment of the pipe connector of FIG. 1 showing a sequence of disconnecting the pipe elements.

FIG. 7 is an enlarged side elevation, partly in section of the pipe connector of FIGS. 3 - 6, showing details of the threaded portion of the annular seal and of the cavity.

FIG. 8 is a further enlarged inside elevation of one embodiment of a portion of the threaded seal of FIG. 7.

FIG. 9 is another embodiment of the threaded seal of FIG. 8.

DESCRIPTION OF THE PREFERRED EMBODIMENT

FIGS. 1, 2 disclose a pipe connector device 9 having a pair of pipe elements 10, 11 interconnected by a pair of retention members 12, 13 and a pair of load elements 17. Pipe elements 10, 11 are mounted in an internal bore 12a, 13a of the retention members 12, 13 and secured to members 12, 13 by load elements 17, each mounted in a pair of grooves 18a, 18b and 18c, 18d.

To assemble connector device 9, member 12 is positioned about pipe element 10 with groove 18a adjacent to groove 18b and member 13 is positioned about pipe element 11 with groove 18c adjacent to groove 18d. A plug 19 is removed from a bore 20 of member 12 and a plurality of load elements 17 are fed through bore 20 into grooves 18a, 18b to secure member 12 to pipe element 10 and plug 19 is replaced in bore 20. A plug 24 is removed from a bore 25 and a plurality of load elements 17 are fed through bore 25 into grooves 18c, 18d to secure member 13 to pipe element 11. Plug 24 is replaced in bore 25 to keep load elements 17 in place. A sealing member 26 is placed in a portion of a cavity 30 adjacent to a center bore 31 of pipe element 10. Pipe elements 10, 11 are positioned with center bore 31 of pipe element 10 aligned with a center bore 32 of pipe element 11. Member 12 is rotated relative to member 13 so that a threaded portion 12b of member 12 mates with a 0 threaded portion 13b of member 13 and draws pipe elements 10, 11 toward the position shown in FIG. 1. A portion of sealing member 26 moves into a cavity 36 adjacent to center bore 32 to provide a fluid tight seal between elements 10 and 11. Groove 18c is wider 25 than groove 18d so that retention members 12, 13 can be partially threaded together before a rotation of member 12 relative to member 13 applies pressure to secure pipe elements 10, 11 in tight abutment.

Another embodiment of the present invention 9a disclosed in FIGS. 3 - 6 includes another wide groove 18e in retention member 12d. Plugs 19, 24, disclosed in FIGS. 1, 2, have been omitted from FIGS. 3 – 6 in order to simplify the drawings but it should be understood that such plugs are needed to install the load elements 17a, 17b.

When it is desired to disconnect pipe element 10 from pipe element 11, to replace seal 26 or for other reasons, member 12d is rotated relative to member 13 causing the members 12d, 13 to be spaced as shown in FIG. 4. Further rotation of member 12d relative to member 13 causes a shoulder 37 of groove 18e to press against a load element 17a and a shoulder 8 of groove 18c to press against a load element 17b to move pipe element 10 away from pipe element 11 as shown in FIG. 5. The slight separation of elements 10, 11 allows any internal pressure in bores 31, 32 to I bleed off while threads 12b, 13b are still engaged and prevent elements 10, 11 from being blown apart. Still further rotation of retention member 12d allows pipe elements 10, 11 to be separated as shown in FIG. 6.

The forced separation of pipe elements 10, 11 due to rotation of members 12, 13 prevents elements 10, 11 from sticking together and facilitates seal replacement or dismantling of flowline systems.

In the embodiments disclosed in FIGS. 1 – 6 pipe elements 10, 11 are identical which simplifies manufacturing and reduces costs compared to connectors using unlike pipe elements. The load elements 17, 17a, 17b can also be identical to reduce costs.

An improved seal 26a for use in connector devices 9, 9a is disclosed in the enlarged drawing of FIG. 7. A threaded outer portion 26b of seal 26a is pressed against a substantially smooth inner surface 30b of cavity 30 to secure seal 26a to pipe element 10 when pipe elements 10 and 11 are separated. This prevents seal 26a from being dropped and possibly lost when retention members 12d, 13 are separated. The right hand portion (FIGS. 3, 7) of seal 26a is positioned in cavity 30 and the left hand portion of seal 26a is in cavity 36 when pipe elements 10, 11 are locked together as shown in FIG. 3. Since load elements 17 are locked into grooves 18a – 18d the present invention has no loose pieces when members 12, 13 are separated. When seal 26a needs to be replaced, member 12d is rotated relative to member 13 until members 12d, 13 are separated. Seal 26a is pulled axially away from center bore 31 until threaded portion 26b disengages from surface 30b of cavity 30. A new seal 26a is pushed into cavity 30 and retention member 12d relative to retention member 13 to reconnect the pipe elements in a fluid-tight arrangement.

A plurality of threads 40 (FIG. 8) are formed on seal 26a so they tilt toward a center groove 41 to facilitate moving seal 26a into cavity 30 (FIG. 7) with threads 40 pressed against surface 30b of cavity 30. This tilt also causes a plurality of radially outer points 42 to press even more firmly against surface 30b when seal 26a attempts to move from right to left in cavity 30. A diameter D1 of seal 26a is slightly (0.001" to 0.005") greater than a diameter D2 of cavity 30 to insure a tight fit of seal 26a in cavity 30. Threads 40 can be spiral threads of the type used on bolts or threads 40 can be formed in concentric circles. An advantage of the spiral threads is, they can be formed using a conventional thread die of the type used on large bolts. The thread die also provides accurate values of diameter to outer points 42 of seal 26a at a low cost. An advantage of having threads which are circular is easier replacement of seals 26a. Circular threaded seals remain close to the center 46 of cavity 30 (FIG. 7) as they are being re-moved, while spiral threads may cause seal 26a to be forced away from the center line 35 of cavity 30 and bind against surface 30b of cavity 30.

If greater holding power is desired the tilt of the threads may be increased as shown in a plurality of threads 40a (FIG. 9). The outer points 42 of threads 40a (FIG. 8) and 40 (FIG. 9) slightly when seal 26a is forced into cavity 30 (FIG. 7).

The present invention uses few parts to provide a connector device for swivel joints and for a pipe connector. A threaded seal is attached to one pipe element to prevent dropping the seal when a pair of pipe elements are separated. Other elements are also secured to the pipe elements to prevent loose pieces from being dropped or lost.

Although the best mode contemplated for carrying out the present invention has been herein shown and described, it will be apparent that modification and variation may be made without departing from what is regarded to be the subject matter of the invention.

What is claimed is:

1. In a pipe connector apparatus having interconnecting means for selectively securing a pair of pipe elements in a fixed end-to-end relationship and for sealing a junction between the pipe elements to prevent leaks, an improved sealing device comprising:

a first pipe element having a central bore extending lengthwise through said first pipe element and having a first cavity adjacent to said center bore in an end portion of said first pipe element with a substantially smooth inner surface defining an outer boundary of said first cavity;

a second pipe element having a central bore extending lengthwise through said second pipe element and having a second cavity adjacent to said center bore in an end portion of said second pipe element; and an annular seal with a center for mounting in said first and said second cavities and extending along a portion of the length of said first and said second pipe elements adjacent to an end portion of each of said first and said second pipe elements to prevent leakage at a joint between said pipe elements, said annular seal including a threaded outer portion having a plurality of radially outer points which press against said inner surface of said first cavity to retain said annular seal in said first cavity when said first and said second pipe elements are separated, each of said outer points being tilted toward the center of the seal and relative to said outer portion of said seal so said outer points are bent radially inward by said inner surface of said first cavity to facilitate moving said seal into said first cavity, said outer points pressing firmly against said inner surface of said first cavity to resist attempts to move said seal in a reverse direction out of said first cavity.

2. A pipe connector sealing device as defined in claim 1 wherein a diameter of said threaded outer portion of said annular seal is greater than a diameter of said first cavity causing said outer points of said threaded portion of said seal to be forcibly pressed against said inner surface of said first cavity to firmly hold said seal in said first cavity.

3. A pipe connector sealing device as defined in claim 1 wherein said threaded outer portion of said seal includes a plurality of threads, each of said threads having an outer point which is tilted relative to said sealing device to facilitate moving said sealing device into said first cavity and to increase the difficulty of removing said sealing device from said first cavity.

4. A pipe connector sealing device as defined in claim 1 wherein said threaded outer portion of said seal includes a plurality of threads.

5. A pipe connector sealing device as defined in claim 1 wherein said threaded outer portion of said seal includes a spiral threaded area of the type formed by a thread die.

6. A pipe connector sealing device as defined in claim 1 wherein each of said outer points is tilted toward the center of said annular seal as said annular seal is moved into said first cavity to permit said outer points to slide over said inner surface of said first cavity as said annular seal is moved into said first cavity, said tilt causing said outer points to wedge tightly against said inner surface of said first cavity of said first pipe element to resist any movement of said annular seal in a reverse direction out of said first cavity and said annular seal fitting tightly in said first cavity thereby preventing leakage between the engagement of the annular seal and said first cavity of said first pipe element.

* * * * *